(12) United States Patent
Chihara et al.

(10) Patent No.: US 12,552,237 B2
(45) Date of Patent: Feb. 17, 2026

(54) VEHICLE MOUNTING STRUCTURE OF BATTERY PACK

(71) Applicant: TOYOTA JIDOSHA KABUSHIKI KAISHA, Toyota (JP)

(72) Inventors: Koji Chihara, Okazaki (JP); Yohsuke Imai, Nagoya (JP); Masahiro Shirakawa, Nagoya (JP); Tomoki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 270 days.

(21) Appl. No.: 18/476,949

(22) Filed: Sep. 28, 2023

(65) Prior Publication Data

US 2024/0208316 A1 Jun. 27, 2024

(30) Foreign Application Priority Data

Dec. 26, 2022 (JP) .................................. 2022-208592

(51) Int. Cl.
*B60K 1/04* (2019.01)
*B62D 21/02* (2006.01)
*B62D 25/20* (2006.01)

(52) U.S. Cl.
CPC ............... *B60K 1/04* (2013.01); *B62D 21/02* (2013.01); *B62D 25/20* (2013.01); *B60K 2001/0438* (2013.01)

(58) Field of Classification Search
CPC ............. B60K 1/04; B60K 2001/0438; H01M 50/246; H01M 50/244; B62D 21/02
See application file for complete search history.

(56) References Cited

U.S. PATENT DOCUMENTS

| | | | |
|---|---|---|---|
| 9,533,600 B1 * | 1/2017 | Schwab | H01M 10/613 |
| 11,912,122 B2 * | 2/2024 | Bohmer | B60L 50/64 |
| 2020/0070639 A1 | 3/2020 | Bohmer et al. | |
| 2021/0242524 A1 | 8/2021 | Kaita et al. | |
| 2022/0149469 A1 | 5/2022 | Kim et al. | |

FOREIGN PATENT DOCUMENTS

JP 7238820 B2 3/2023

* cited by examiner

*Primary Examiner* — Jason D Shanske
*Assistant Examiner* — James J Triggs
(74) *Attorney, Agent, or Firm* — SoraIP, Inc.

(57) ABSTRACT

A vehicle mounting structure of a battery pack according to the present disclosure includes a battery pack provided on a bottom surface of a vehicle body, a support frame that supports the battery pack on the bottom surface of the vehicle body, and multiple fastening members that mechanically fasten the support frame and the bottom portion of the battery pack. The fastening members include a front fastening member provided at a position of a vehicle front center at a bottom portion of the battery pack, a rear fastening member provided at a position of a vehicle rear center at a bottom portion of the battery pack, a left fastening member provided at a position of a vehicle left center at a bottom portion of the battery pack, and a right fastening member provided at a position of a vehicle right center at a bottom portion of the battery pack.

5 Claims, 3 Drawing Sheets

VEHICLE MOUNTING STRUCTURE OF BATTERY PACK

CROSS-REFERENCE TO RELATED APPLICATION

This application claims priority to Japanese Patent Application No. 2022-208592 filed on Dec. 26, 2022, incorporated herein by reference in its entirety.

BACKGROUND

1. Technical Field

The present disclosure relates to a mounting structure of a battery pack mounted on a vehicle to a vehicle body.

2. Description of Related Art

US 2020/0070639 A1 discloses a vehicle in which a battery pack is mounted on a bottom surface of a vehicle body. In this conventional vehicle, the battery pack is not mechanically fastened to a frame provided on the bottom surface of the vehicle. Instead, the battery pack is supported by a support structure attached to the bottom frame of the vehicle. An isolator is provided between the battery pack and the support structure. The isolator is provided for the purpose of separating the battery pack from the load applied to the bottom frame or support structure of the vehicle during vehicle travel.

SUMMARY

However, in the vehicle of US 2020/0070639 A1, a large number of isolators are installed. When the number of isolators is large, the natural frequency of the battery pack decreases, which may adversely affect the battery pack and its internal components due to resonance during traveling of the vehicle. In addition, although the vehicle of US 2020/0070639 A1 focuses on the load when the vehicle is traveling, it does not focus on the torsion of the vehicle in the roll direction. Therefore, there is room for improvement from the viewpoint of reducing the influence of torsion on the battery pack during vehicle traveling.

One object of the present disclosure is to provide a technique that allows reducing the influence of torsion in a roll direction on a battery pack when a vehicle is traveling.

A first aspect of the present disclosure relates to a battery pack mounting structure.

A battery pack mounting structure is characterized in that the battery pack mounting structure includes: a battery pack provided on a bottom surface of a vehicle body of a vehicle; a support frame that supports the battery pack on the bottom surface of the vehicle body; and a plurality of fastening members that mechanically fastens the support frame and a bottom of the battery pack, and in the battery, and in the battery pack mounting structure, the fastening members include: a front fastening member provided at a position of a vehicle front center at the bottom of the battery pack; a rear fastening member provided at a position of a vehicle rear center at the bottom of the battery pack; a left fastening member provided at a position of a vehicle left center at the bottom of the battery pack; and a right fastening member provided at a position of a vehicle right center at the bottom of the battery pack.

According to the first aspect, the support frame supporting the battery pack on the bottom surface of the vehicle body and the bottom of the battery pack are mechanically fastened by the fastening members. The fastening members include the front, rear, left, and right fastening members. These respective fastening members are provided at the positions of the vehicle front center, the vehicle rear center, the vehicle left center, and the vehicle right center at the bottom of the battery pack. These positions are positions where torsion in the roll direction during vehicle traveling is difficult to be input. Therefore, according to the first aspect, it is possible to minimize the influence of the torsion in the roll direction on the battery pack when the vehicle is traveling. This leads to the prevention of a decrease in the strength of the battery pack and its internal components.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

1. Vehicle to which Battery Pack is Attached

Figure 1:
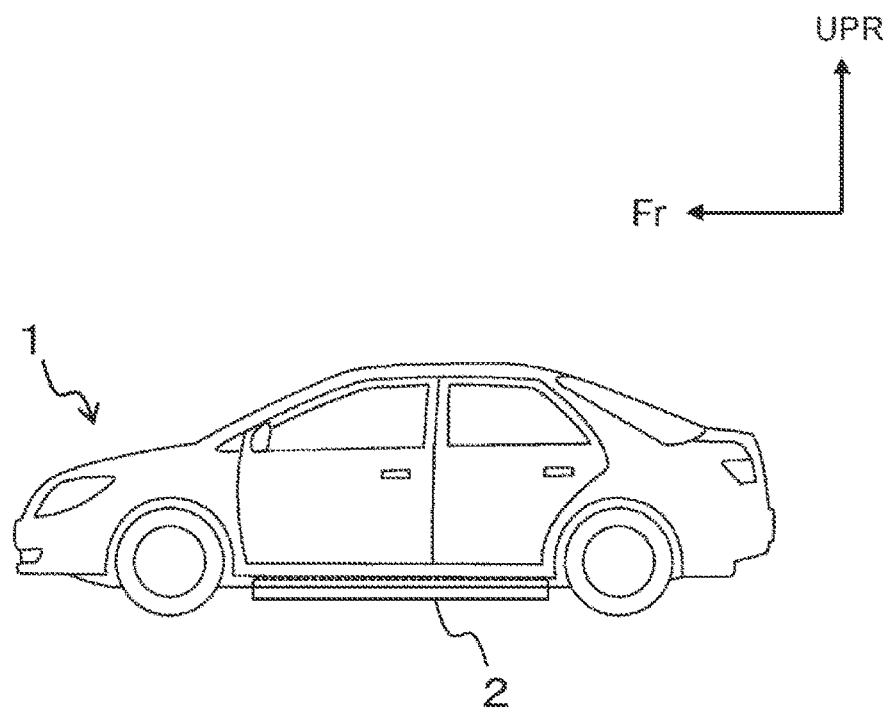
FIG. 1 is a diagram illustrating an example of a vehicle to which a battery pack mounting structure according to an embodiment of the present disclosure is applied.

FIG. 1 is a diagram illustrating an example of a vehicle to which a battery pack mounting structure according to an embodiment of the present disclosure is applied. The "Fr" shown in FIG. 1 corresponds to the front of the vehicle. The "UPR" orientation shown in FIG. 1 corresponds to the upper part of the vehicle.

The vehicle 1 shown in FIG. 1 is, for example, a battery electric vehicle (BEV), hybrid electric vehicle (HEV), plug-in hybrid electric vehicle (PHEV), fuel cell electric vehicle, and the like. The vehicle 1 may be a vehicle having a ladder frame or a vehicle having no ladder frame. An example of a vehicle having no ladder frame is a vehicle having a monocoque structure. In general, a vehicle having a ladder frame is often manufactured for the purpose of traveling off-road with a tire having a high vehicle height and a large diameter. On the other hand, a vehicle having a monocoque structure has a wide interior, and many vehicles are manufactured for the purpose of driving a paved road with good fuel efficiency.

A battery pack 2 is mounted on the vehicle 1. The battery pack 2 is attached to the bottom surface of the vehicle body of the vehicle 1. The longitudinal direction of the battery pack 2 extends in the front-rear direction of the vehicle 1, for example. The battery pack 2 includes a plurality of battery cells, for example. The battery cell is, for example, a lithium ion secondary battery.

2. Example of Mounting the Battery Pack to the Bottom of the Vehicle Body

Figure 2:
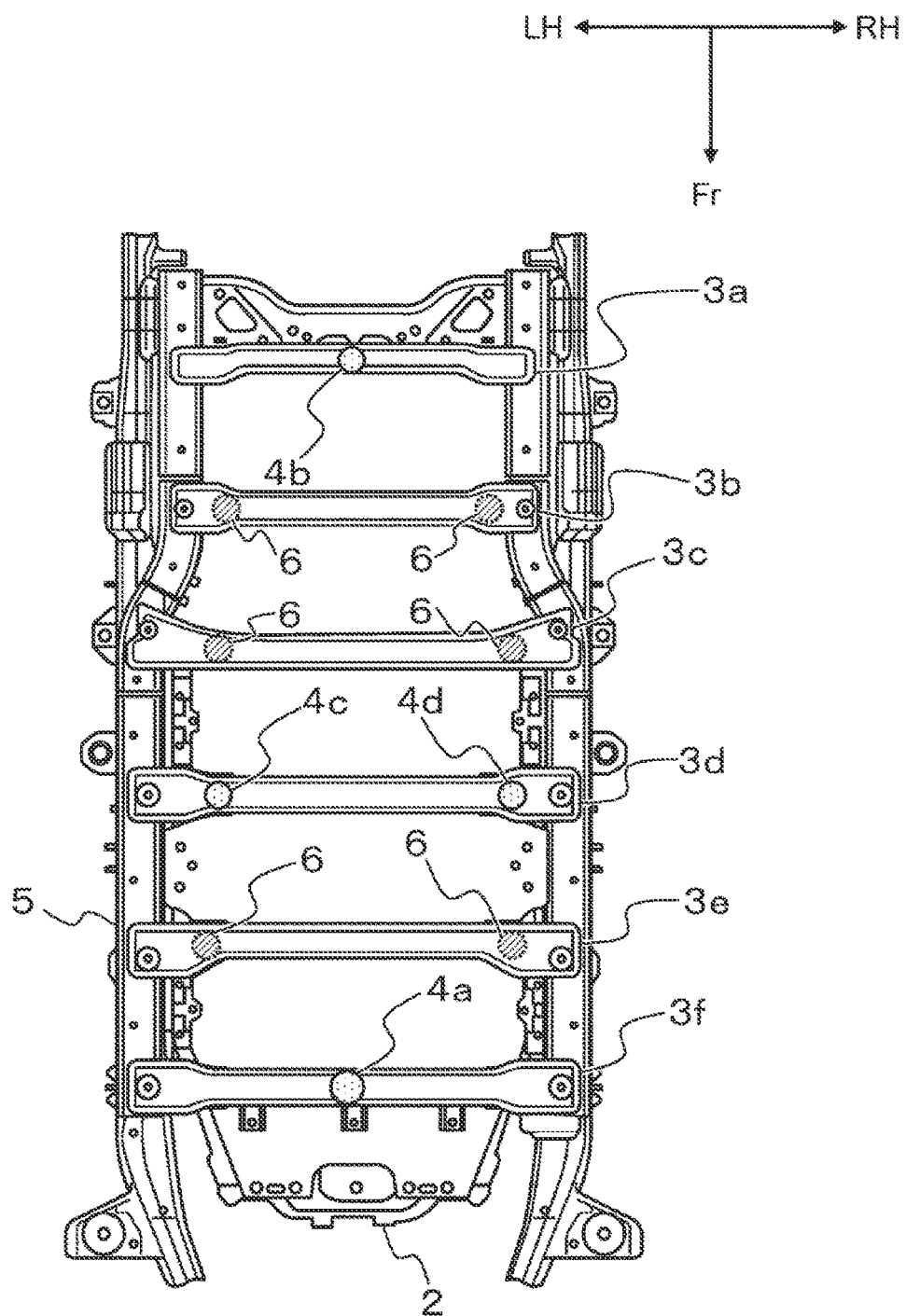
FIG. 2 is a diagram illustrating an example of attachment of a battery pack to a bottom surface of a vehicle body according to the present disclosure.

FIG. 2 is a diagram illustrating an example of attachment of the battery pack 2 to the bottom surface of the vehicle body. FIG. 2 corresponds to a view of a configuration around the battery pack 2 mounted on the vehicle having the ladder frame 5 as viewed from the bottom surface side. The "LH" shown in FIG. 2 corresponds to the left side of the vehicle. The "RH" shown in FIG. 2 corresponds to the right side of the vehicle.

In FIG. 2, the support frames 3a to 3f, a front fastening member 4a, a rear fastening member 4b, a left fastening member 4c, and a right fastening member 4d are illustrated as a configuration for attaching the battery pack 2 to the bottom surface of the vehicle body. Hereinafter, the fastening members 4a to 4d are collectively referred to as the "fastening member 4" when the fastening member 4a to 4d are not particularly distinguished from each other.

In the embodiment shown in FIG. 2, the bottom of the battery pack 2 is supported by the support frames 3a to 3f. Hereinafter, the support frames 3a to 3f are collectively referred to as a "support frame 3" when the support frames 3a to 3f are not particularly distinguished from each other. The support frame 3 is connected to the ladder frame 5. In the case of a vehicle without the ladder frame 5, the support frame 3 is connected to a monocoque structure. The support frame 3f corresponds to the "front support frame" in the present disclosure. The support frame 3a corresponds to the "rear support frame" in the present disclosure. The support frame 3d corresponds to an "intermediate support frame" in the present disclosure.

The fastening member 4 mechanically fastens the support frame 3 and the bottom of the battery pack 2. The fastening member 4 is a combination of a bolt and a nut, for example. For example, bolts are passed through holes formed in the bottom portions of the support frame 3 and the battery pack 2 from the bottom surface side of the vehicle body. Then, for example, a bolt is combined with a nut provided inside the battery pack 2. In yet another example, the bolt and the internal thread provided at the bottom of the battery pack 2 are combined. As a result, the support frame 3 and the bottom of the battery pack 2 are fastened.

The position where the front fastening member 4a is provided is the front center at the bottom of the battery pack 2. The position where the rear fastening member 4b is provided is the rear center at the bottom of the battery pack 2. The position where the left fastening member 4c is provided is the left center at the bottom of the battery pack 2. The position where the right fastening member 4d is provided is the right center of the bottom portion of the battery pack 2.

In the present disclosure, the "center" in the front center, the rear center, the left center, and the right center at the bottom of the battery pack 2 are not intended to be strictly centered. That is, the front center may include a constant error in the left-right direction from the front center at the bottom of the battery pack 2. The left center may include a constant error in the front-rear direction from the front center at the bottom of the battery pack 2. The posterior center view is the same as that of the anterior center. The idea of the right center is the same as that of the left center.

In FIG. 2, the elastic body 6 is further depicted by a dashed line. A dashed line is drawn because the elastic body 6 is located between the support frame 3 and the bottom of the battery pack 2. The elastic body 6 is, for example, a rubber mount. In the embodiment shown in FIG. 2, two elastic members 6 are provided on the rear surface of each of the support frames 3b, 3c, and 3e.

3. Effect of Battery Pack Mounting Structure

Figure 3:
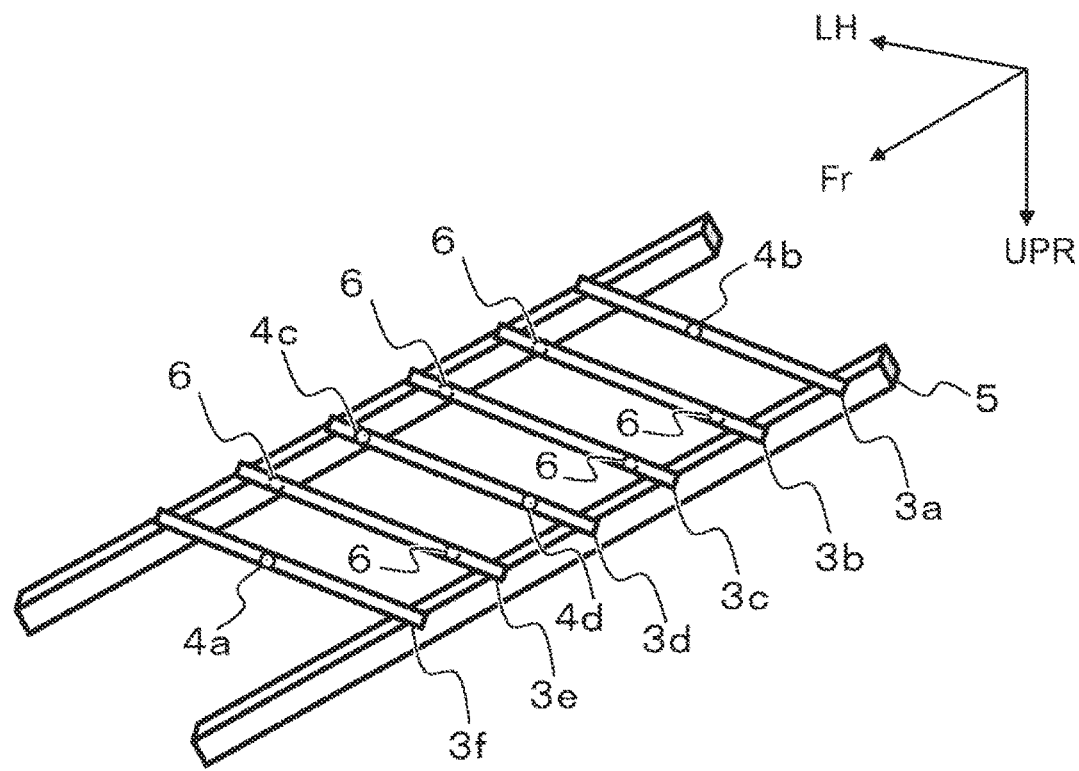
FIG. 3 is a diagram for explaining the advantages of the embodiment.
Figure 4:
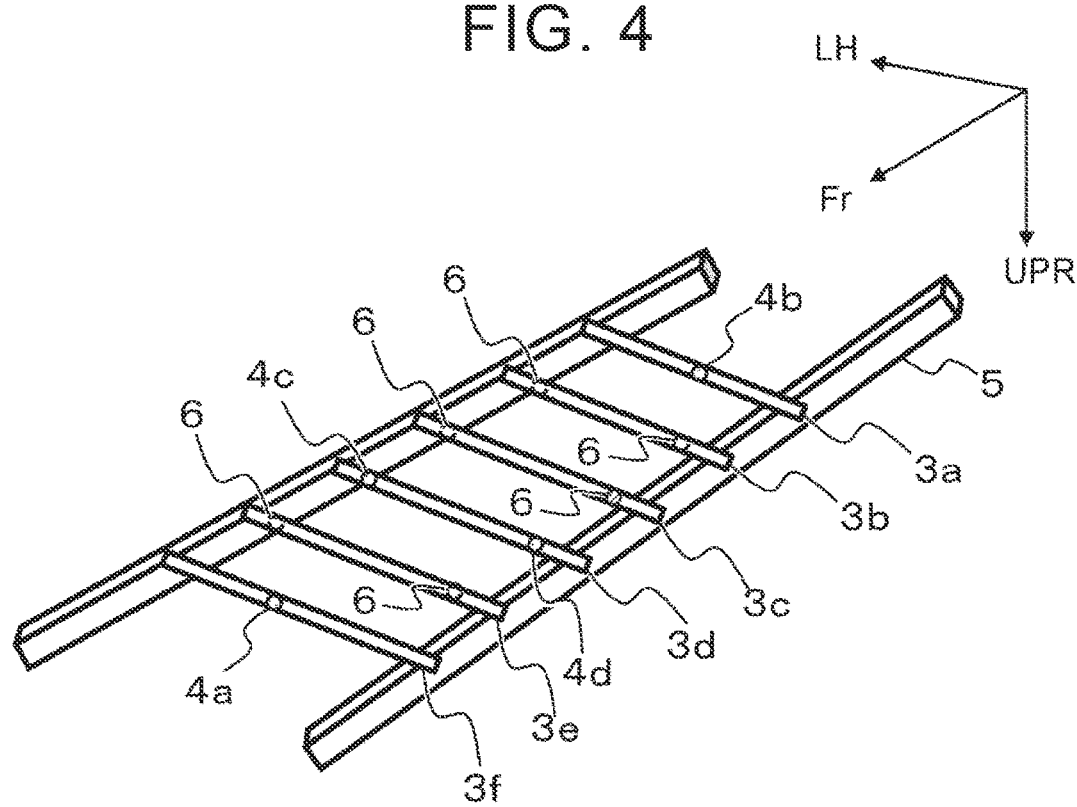
FIG. 4 is a diagram for explaining the advantages of embodiment.

FIG. 3 and FIG. 4 are diagrams for explaining effects of the embodiment. In FIGS. 3 and 4, a portion of the mounting structure described with reference to FIG. 2 excluding the battery pack 2 is shown. FIG. 3 shows a state before twisting of the ladder frame 5 in the roll direction of the vehicle 1 occurs. On the other hand, FIG. 4 shows a state after the torsion of the ladder frame 5 has occurred.

For example, when the vehicle 1 travels on an off-road, a large twist in the roll direction may occur in the ladder frame 5. However, as can be understood from FIGS. 3 and 4, the change in the position where the front fastening member 4a is provided before and after the ladder frame 5 is twisted is small. Further, before and after the ladder frame 5 is twisted, the change in the positions where the rear fastening member 4b, the left fastening member 4c, and the right fastening member 4d are provided is small. This means that the installation position of the fastening member 4 such as the front fastening member 4a is a position where twisting in the roll-direction is difficult to be inputted.

Therefore, according to the embodiment, even if a twist in the roll direction of the vehicle 1 occurs, it is possible to prevent the twist from being input to the battery pack 2. Therefore, it is possible to minimize the influence of the twisting in the roll direction on the battery pack 2. This leads to the prevention of a decrease in the strength of the battery pack 2 and its internal components.

Further, according to the embodiment, it is possible to minimize the influence of the twisting in the roll direction on the battery pack, particularly in the case where the vehicle 1 performs off-road traveling. Further, according to the embodiment, the elastic body 6 is provided separately from the fastening member 4. Therefore, it is also possible to suppress transmission of vibration generated during traveling of the vehicle 1 to the battery pack 2.

4. Modification

The present disclosure is not limited to the above-described embodiment, and various modifications are possible. For example, the support frame 3 is provided in the left-right direction of the vehicle 1. However, the support frame 3 may be provided in the front-rear direction of the vehicle 1. It is conceivable that the front fastening member 4a and the rear fastening member 4b are provided on the same support frame extending in the front-rear direction in the center of the vehicle. Further, it is conceivable that the left fastening member 4c is provided on a support frame extending in the front-rear direction on the left side of the vehicle. It is conceivable that the right fastening member 4d is provided on a support frame extending in the front-rear direction on the left side of the vehicle.

In the embodiment, the total number of the fastening members 4 is 4. However, the total number may be greater than 4. However, in this case, it is desirable to specify a portion where the change in the position is small in the case where the twist in the roll direction of the vehicle 1 occurs by a pre-simulation or the like, and to install an additional fastening member in this portion.

In the embodiment, the total number of the support frames 3 is 6. However, the total number may be less than 6 or more than 6. However, the total number of the support frames 3 is at least 3. One of the at least three support frames 3 is fastened to the bottom of the battery pack 2 by two fastening member 4 (for example, the left fastening member 4c and the right fastening member 4d). The remaining two are fastened to the bottom of the battery pack 2 by one fastening member 4 (e.g., a front fastening member 4a or a rear fastening member 4b), respectively.

In the embodiment, the total number of the elastic bodies 6 was 6. However, the total number may be less than 6 or more than 6. However, if the total number of the elastic bodies 6 increases, there is a possibility that a decrease in the natural frequency of the mounting structure may occur, and therefore, it is desirable that an upper limit is set for the total number.

What is claimed is:

1. A battery pack mounting structure comprising:
   a battery pack provided on a bottom surface of a vehicle body of a vehicle;
   at least three support frames that support the battery pack on the bottom surface of the vehicle body, the at least three support frames including a front support frame provided at a front side in a front-rear direction of the vehicle, a rear support frame provided at a rear side in the front-rear direction, and an intermediate support frame provided at a center in the front-rear direction, each of the at least three support frames extending in a left-right direction perpendicular to the front-rear direction of the vehicle; and
   a plurality of fastening members that mechanically fasten a bottom of the battery pack to the at least three support frames, wherein the fastening members include:
      a front fastening member provided at a first position of a vehicle front center at the bottom of the battery pack, the first position corresponding to center of the front support frame in the left-right direction;
      a rear fastening member provided at a second position of a vehicle rear center at the bottom of the battery pack, the second position corresponding to center of the rear support frame in the left-right direction;
      a left fastening member provided at a third position of a vehicle left center at the bottom of the battery pack, the third position corresponding to a left side of the intermediate support frame in the left-right direction; and
      a right fastening member provided at a fourth position of a vehicle right center at the bottom of the battery pack, the fourth position corresponding to a right side of the intermediate support frame in the left-right direction.

2. The battery pack mounting structure according to claim 1, wherein:
   the vehicle includes a ladder frame; and
   the at least three support frames extend over the ladder frame.

3. The battery pack mounting structure according to claim 1, wherein:
   the at least three support frames further include at least one support frame provided between the front support frame and the rear support frame; and
   the battery pack mounting structure further comprises an elastic body provided between the at least one support frame and the battery pack.

4. The battery pack mounting structure according to claim 1, wherein each of fastening members is a combination of a bolt and a nut.

5. A battery pack mounting structure comprising:
   a battery pack on a bottom surface of a vehicle body of a vehicle;
   a ladder frame including a first frame and a second frame, each of the first frame and the second frame extending in a front-rear direction of the vehicle, the first frame being provided at a right side of the bottom surface in a left-right direction perpendicular to the front-rear direction of the vehicle, and the second frame being provided at a left side of the bottom surface in the left-right direction;
   a plurality of support frames extending in the left-right direction over the ladder frame;
   a plurality of pairs of bolts and nuts that fasten the battery pack to the plurality of support frames such that
      a lateral center, in the left-right direction, of a front end portion of a bottom of the battery pack in the front-rear direction is fastened to the lateral center of a first support frame, the first support frame being positioned foremost among the plurality of support frames in the front-rear direction,
      the lateral center of a rear end portion of the bottom of the battery pack in the front-rear direction is fastened to the lateral center of a second support frame, the second support frame being positioned rearmost among the plurality of support frames in the front-rear direction,
      a longitudinal center, in the front-rear direction, of a right end portion of the bottom of the battery pack in the left-right direction is fastened to a right end of a third support frame in the left-right direction, the third support frame being positioned between the first support frame and the second support frame among the plurality of support frames, and
      the longitudinal center of a left end portion of the bottom of the battery pack in the left-right direction is fastened to a left end of the third support frame in the left-right direction; and
   a plurality of rubber mounts that are provided between the bottom of the battery pack and at least one support frame that differs from the first support frame, the second support frame, and the third support frame among the plurality of support frames, at right and left end portions in the left-right direction.

* * * * *